United States Patent [19]

Takahashi

[11] 4,416,056

[45] Nov. 22, 1983

[54] PROCESS FOR PREPARATION OF FILM COILS

[75] Inventor: Yoshio Takahashi, Yokohama, Japan

[73] Assignee: Fujitsu Limited, Kawasaki, Japan

[21] Appl. No.: 154,402

[22] PCT Filed: Dec. 12, 1978

[86] PCT No.: PCT/JP78/00049
§ 371 Date: Aug. 13, 1979
§ 102(e) Date: Aug. 3, 1979

[87] PCT Pub. No.: WO79/00383
PCT Pub. Date: Jun. 28, 1979

[30] Foreign Application Priority Data

Dec. 13, 1977 [JP] Japan ............................ 52-149548
Dec. 13, 1977 [JP] Japan ............................ 52-149549
Dec. 13, 1977 [JP] Japan ............................ 52-149551

[51] Int. Cl.³ ....................... G11B 5/42; H01F 41/04
[52] U.S. Cl. ..................... 29/603; 29/602 R; 360/123; 360/124; 427/116
[58] Field of Search ............ 29/602 R, 603; 360/123, 360/124; 156/650, 656, 659.1, 661.1, 901; 427/116

[56] References Cited

U.S. PATENT DOCUMENTS 3,685,144 8/1972 Trimble .............................. 29/603
3,798,059 3/1974 Astle et al. ......................... 336/200

FOREIGN PATENT DOCUMENTS 49-6448 1/1974 Japan .

Primary Examiner—Carl E. Hall
Attorney, Agent, or Firm—Staas & Halsey

[57] ABSTRACT

A process for the preparation of film coils is disclosed, which comprises forming a first plane coil layer by arranging a plurality of insulated spiral conductor patterns wound in the same direction adjacent to one another without any gaps, laminating on the first plane coil layer a second plane coil layer formed by arranging a similar plurality of spiral conductor patterns wound in the reverse direction, and connecting the conductor patterns in the first plane coil layer to the conductor patterns in the second plane coil alternately through windows in the insulation separating the plane coil layers to form one coil. The flatness of the resulting structure allows plane coil layers to be laminated to form a stack. The resulting coils may be employed to produce a multi-track recording head with minimal distance between the heads, transformers, and other inductors, including center-tapped inductors.

4 Claims, 43 Drawing Figures

PROCESS FOR PREPARATION OF FILM COILS

DESCRIPTION

1. Technical Field

The present invention relates to a process for the preparation of film coils for use in, for example, thin-film magnetic heads, utilizing the technique of photolithography, and more particularly, the invention relates to a process for the preparation of a flattened multi-layer, multi-winding conductor coil.

2. Background Art

In forming a multi-layer pattern structure on the surface of a semiconductor in the field of semiconductor integrated circuits, there has heretofore been adopted a method in which patterns of respective layers are laminated in sequence from a lower layer to a higher layer according to the ordinary photolithographic technique. In this method, if a layer is not a flat but includes convexities and concavities, corresponding convexities and concavities are formed in the layers laminated thereon. Accordingly, the flatness of the topmost layer is influenced by the convexities and concavities of all the layers and, even if the convexities and concavities of the respective layers are small, the flatness of the topmost layer is considerably degraded. When another pattern layer is formed on a certain layer through a photomask, the presence of such convexities and concavities results in a non-uniformity of the gap between the photomask and the layer surface, and therefore, the precision of the pattern is drastically lowered.

This problem of degradation of the flatness has a close relationship to the subject matter of the present invention. Accordingly, this problem will now be described in detail by reference to the case of a film coil for use in a thin-film magnetic head.

In a conventional thin-film magnetic head, as illustrated in FIG. 1, a lower magnetic layer 2 is formed on a substrate 1, and an upper magnetic layer 4 is formed thereon. A coil 3 is interposed between the layers 2 and 4. Further, a gap 5 for generating a leakage magnetic field for writing and reading is formed between these magnetic layers 2 and 4. In principle, as illustrated in FIG. 2, such a coil 3 is formed by forming a first layer conductor pattern 6 having a spiral shape according to the photolithographic technique, piling a second layer conductor pattern 7 on the first layer conductor pattern 6 with the interposition of insulating layer therebetween, not illustrated in the drawing, connecting one of the ends of these conductor patterns to each other by means of a conductor exposing window 8 formed by etching the insulating layer on the lower layer pattern 6, and forming conductor exposing windows 6A and 7A for connection of a cable on the other ends of the conductor patterns 6 and 7.

Similar procedures to those described above are repeated according to the number of conductor layers to be laminated, and as the number of conductor layers to be laminated is increased, the number of lower layer conductor exposing windows should be increased. More specifically, in case of an n-layer structure, (n-1) windows should be formed. Accordingly, the number of steps in the forming operation is increased and the efficiency of the operation is reduced. Further, when the first conductor layer 6 is formed and the second conductor layer 7 is formed thereon with the interposition of the insulating layer therebetween, a stepped portion is formed between the portion where the second layer conductor 7 is piled on the first layer conductor 6 and the portion where the second layer conductor 7 is not piled on the first layer conductor 6. More specifically, a stepped portion is formed in an area 9 where the first layer conductor 6 does not exist (such area is inevitably present) when the second layer conductor 7 is formed.

Ordinarily, in photolithography, if there is present a stepped portion, the thickness of the resulting resist film in this portion is different from the thickness in the other portion, and as is well-known, a stress imposed on the conductor film in such stepped portion causes various troubles in formation of the pattern. For example, if the thickness of the film conductor pattern 7 formed in the stepped portion is reduced, the resistance value of the conductor is increased, and in the worst case, breaking occurs. According to photolithography, ordinarily, a resist is spin-coated and then subjected to exposure and development, and the resist is thick at the concave part of the above-mentioned stepped portion but is thin at the convex part. Therefore, uniform exposure conditions cannot be attained, and practically it is substantially impossible to form a multi-layer fine and delicate pattern according to photolithography.

DISCLOSURE OF THE INVENTION

In view of the above mentioned circumstances, a primary object of the present invention is to provide a process for the preparation of thin-film multi-winding coils in which a multi-layer conductor pattern can be formed on one plane with a high flatness in the resulting coil.

According to the present invention, this object can be attained by forming a first layer conductor pattern having a spiral shape, forming a second layer conductor pattern of a similar spiral shape in the gap portion of the first layer conductor pattern on the same plane as that of the first layer conductor pattern, thereby to form a first plane coil layer, and laminating a similarly formed second plane coil layer, which is different from the first plane coil layer in the direction of its spiral, on the first plane coil layer.

BRIEF EXPLANATION OF DRAWINGS

FIGS. 5A-(a) to 5A-(c) are sectional views illustrating the conventional etching process, and FIGS. 5B-(a) to 5B-(c) are views illustrating the taper etching process.

FIGS. 7A-(a) to 7A-(e) are top plan views illustrating the steps of the process for preparing a multi-winding coil according to the present invention, and FIGS. 7B-

(a) to 7B-(e) are sectional views corresponding to FIGS. 7A-(a) to 7A-(e), respectively.

FIGS. 8A to 8D are top plan views illustrating the steps of the process for preparing a thin-film magnetic head.

Figure 9:
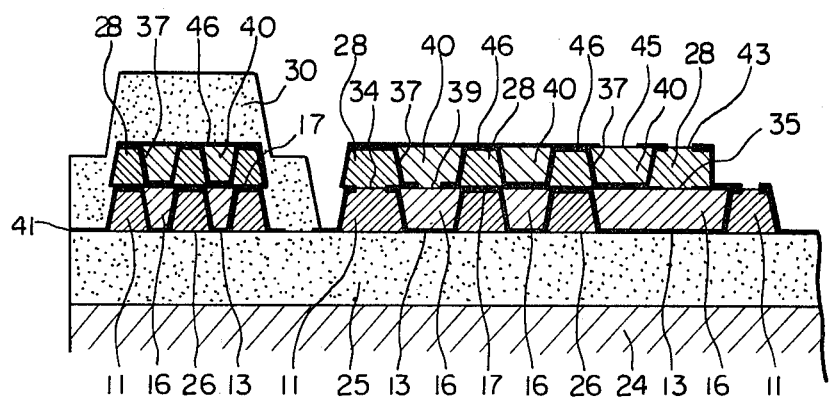

FIG. 9 is a sectional view illustrating a thin-film magnetic head.

FIGS. 10A to 10D are top plan views illustrating the steps of the process for preparing a multi-track thin-film magnetic head.

Figure 10A:
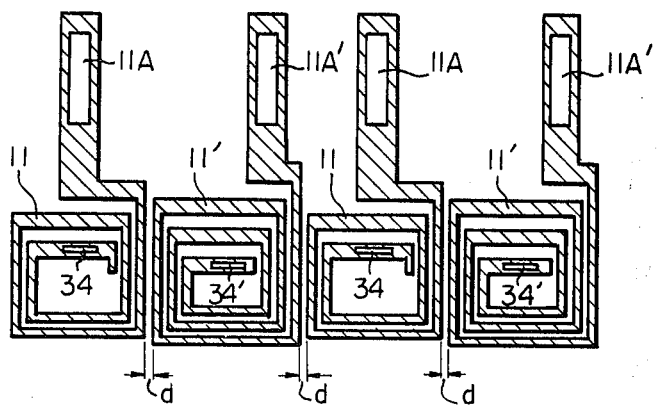
Figure 10B:
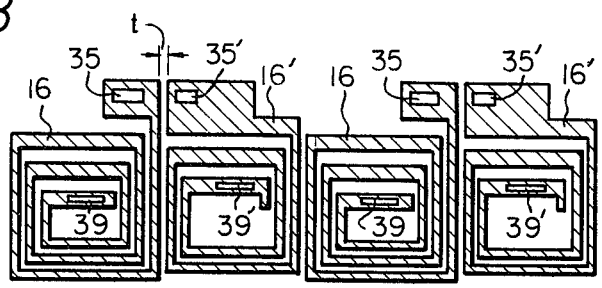
Figure 10C:
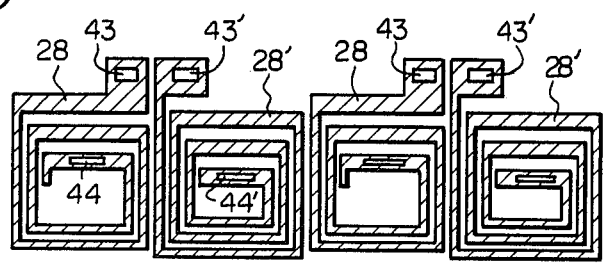
Figure 10D:
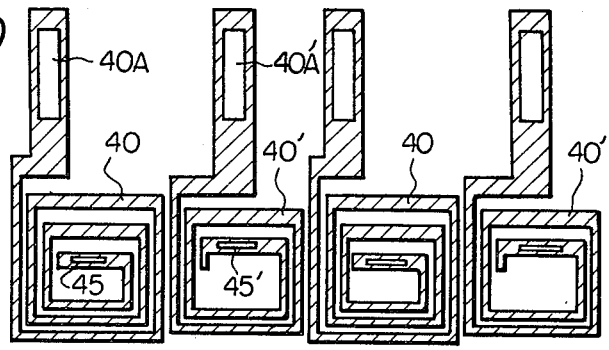
Figure 11A:
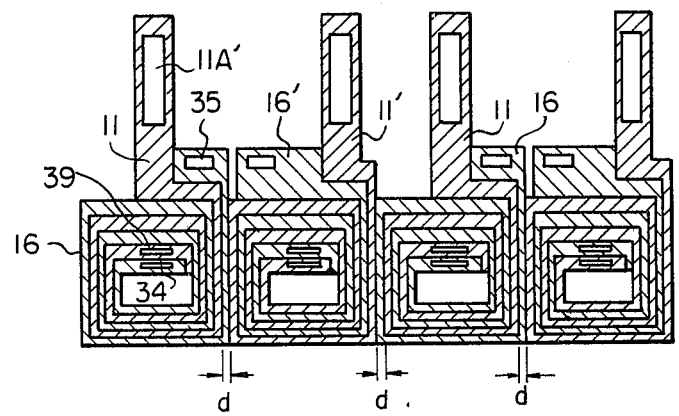
Figure 11B:
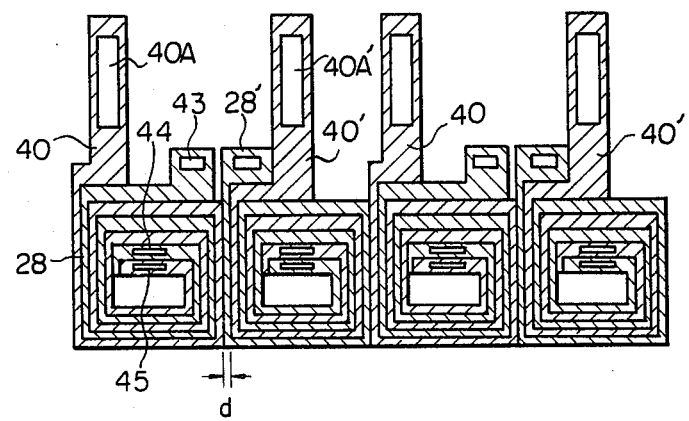

FIG. 11A is a top plan view illustrating the state where the step shown in FIG. 10B has been completed, and FIG. 11B is a top plan view illustrating the state where the step shown in FIG. 10D has been completed.

BEST MODE FOR CARRYING OUT THE INVENTION

The present invention will now be described in detail with reference to the accompanying drawings.

Figure 1:
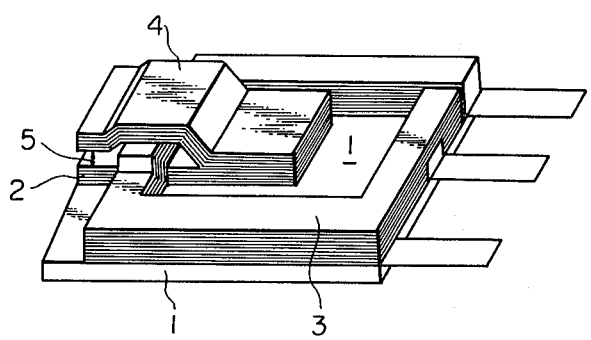
FIG. 1 is a perspective view illustrating a typical instance of the conventional thin-film magnetic head.
Figure 2:
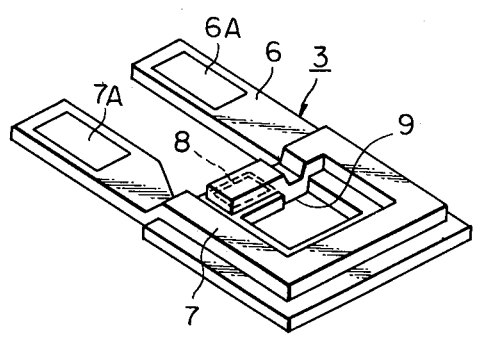
FIG. 2 is a perspective view illustrating, diagrammatically, a film coil for use in the thin-film magnetic head shown in FIG. 1.
Figure 3A:
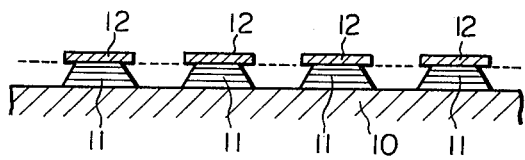
FIGS. 3A to 3D are sectional views illustrating the steps of flattening a two-layer conductor pattern according to the present invention.
Figure 3B:
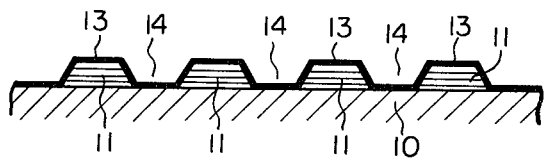
Figure 3C:
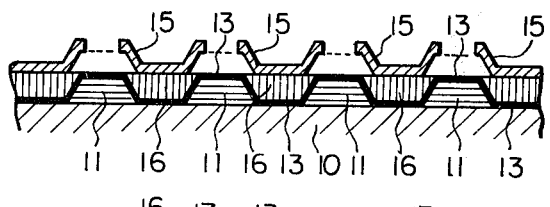
Figure 3D:
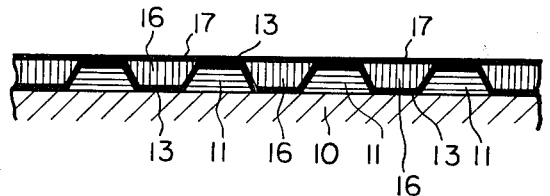

Referring to FIGS. 3A to 3D, a process for flattening two layers of conductor patterns deposited as rectangular "spirals" will now be described. As illustrated in cross section in FIG. 3A, a thin-film fist layer conductor pattern 11 is formed on a substrate 10 by using a photo resist pattern 12 according to an etching technique, such as chemical etching, ion milling or the like; and then, as illustrated in FIG. 3B, an insulating layer 13 is formed on the entire surface of the first layer conductor pattern 11 according to the sputtering method, the vacuum deposition method or the like. Then, as illustrated in FIG. 3C, a second conductor pattern 16 is formed in slit portion 14 between adjacent segments of the first layer conductor pattern 11 by using a resist pattern 15 according to the etching technique, so that the slit 14 is filled up with the second layer conductor pattern 16. Further, as shown in FIG. 3D, an insulating layer 17 is formed on the entire surface on the second layer conductor pattern 16. By the foregoing procedures, the first layer conductor pattern 11 and the second layer conductor pattern 16 are arranged alternately in the same plane to attain flatness. If the steps illustrated in FIGS. 3A to 3D are repeated on the insulating layer 17, a plurality of flattened conductor patterns can be laminated.

Figure 4A:
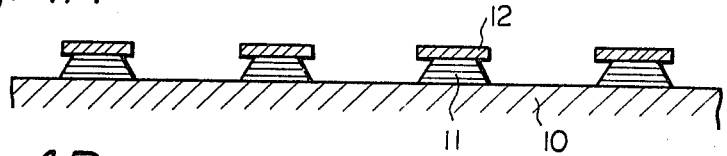
FIG. 4A to 4F are sectional views illustrating the steps of flattening a three-layer conductor pattern according to the present invention, and FIG. 4E' is a view illustrating a modification of the step shown in FIG. 4E.
Figure 4B:
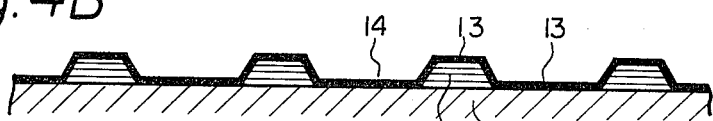
Figure 4C:
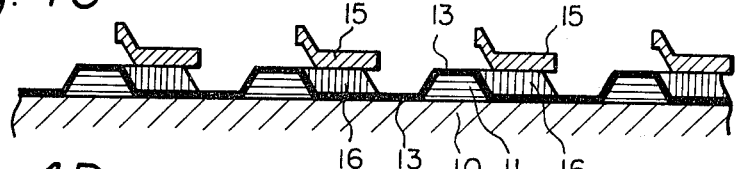
Figure 4D:
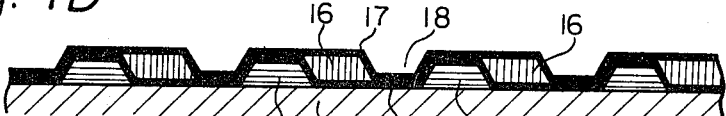
Figure 4E:
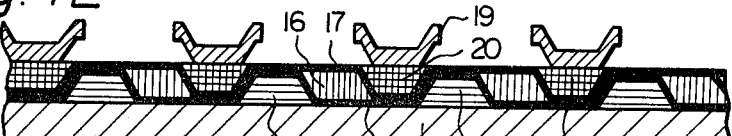
Figure 4F:
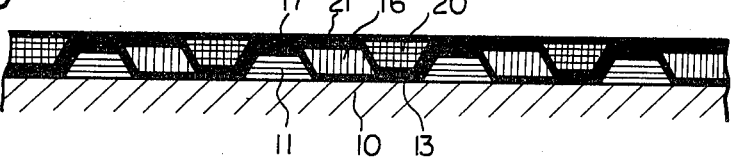
Figure 4E:
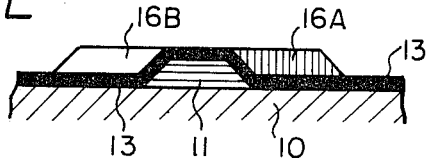

A similar process for flattening three layers of conductor patterns is illustrated in FIGS. 4A to 4F. In the steps illustrated in FIGS. 4A to 4D, as in the steps illustrated in FIGS. 3A to 3D, a first layer conductor pattern 11, an insulating layer 13, a second layer conductor pattern 16 and an insulating layer 17 are formed in sequence on a substrate 10. Further, as illustrated in FIG. 4E, a slit portion 18 is pattern-etched by using a resist pattern 19 to form a third layer conductor pattern 20 filling up the slit portion 18, and, as illustrated in FIG. 4F, an insulating layer 21 is formed on the third layer conductor pattern 20. Thus, the three layers of the conductor patterns 11, 16 and 20 are formed on the same plane. When the above procedures are similarly repeated, an optional number of layers of conductor patterns can be flattened and formed on the same plane. A flattened multi-layer conductor can also be formed by forming two conductors 16A and 16B on the two sides of the first layer, conductor 11, as illustrated in FIG. 4E', and repeating the procedures similarly.

Figure 5A:
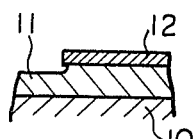
Figure 5B:
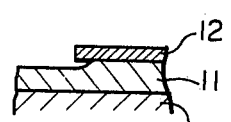
Figure 5A:
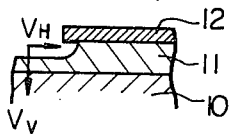
Figure 5B:
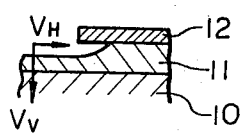
Figure 5A:
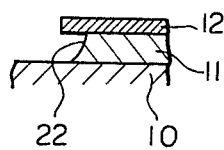
Figure 5B:
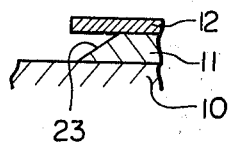

The lithographic mechanism for attaining the above-mentioned flattening will now be described specifically. A process for forming thin-film patterns by chemical etching is illustrated in FIGS. 5A and 5B. For example, a first layer conductor pattern 11 including a resist pattern 12 is ordinarily formed on a substrate 10 by the etching steps illustrated in FIGS. 5A-(a) to 5A-(c). In this process, the speed $V_V$ of etching in the direction of the film thickness is higher than the speed $V_H$ of etching in the direction intruding into the surface boundary of the resist pattern ($V_V > V_H$), and therefore, a relatively steep step 22 is formed in the end portion of the conductor pattern 11 after etching, as illustrated in FIG. 5A-(c). If the property of the surface of the film is changed or the permeability of the etching solution is increased so that the etching speed $V_H$ in the direction intruding into the surface boundary of the resist pattern is higher than the etching speed $V_V$ ($V_V < V_H$), a gradual taper 23 is formed in the end portion of the conductor pattern 11 by etching, as illustrated in FIGS. 5B-(a) to 5B-(c).

Figure 6A:
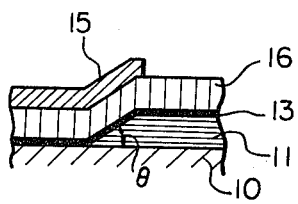
FIGS. 6A to 6C are sectional views illustrating the flattening of conductor patterns according to the taper etching process.
Figure 6B:
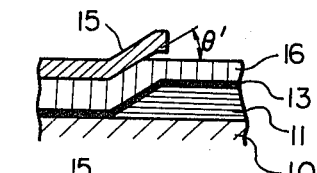
Figure 6C:
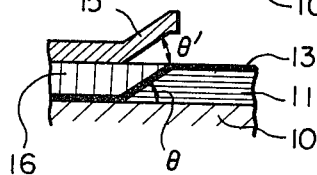

FIGS. 6A to 6C illustrate a process for flattening two layers of conductor patterns by taper etching (bevel etching). As illustrated in FIG. 6A, a first layer conductor pattern 11 is formed on a substrate 10 with a taper angle of $\theta$, and a resist pattern 15 is formed above an insulating layer 13 and a second layer conductor pattern 16. In this state, etching is conducted in the sequence as illustrated in FIGS. 6B and 6C, and if the angle $\theta'$ between the second layer conductor pattern 16 and the resist pattern 15 at the time of completion of etching is equal to the above-mentioned taper angle $\theta$ of the first layer conductor pattern 11, a flattened pattern surface, as illustrated in FIG. 6C, can be obtained.

The process for attaining the flattening in the present invention is not limited to the above described bevel etching process and, of course, the customary lift-off method and the like can be adopted in the present invention.

Formation of a multi-winding coil for a thin-film magnetic head by utilizing the process of the present invention will now be described.

Figure 7A:
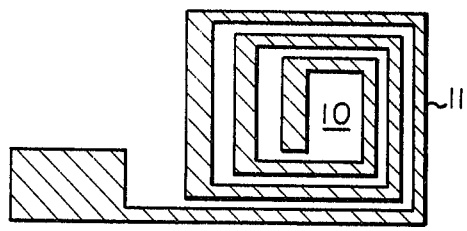
Figure 7A:
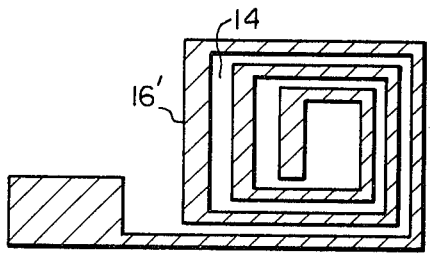
Figure 7A:
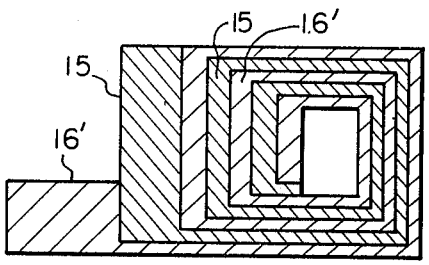
Figure 7A:
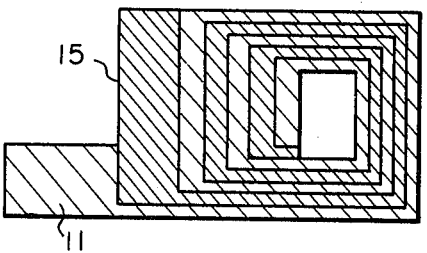
Figure 7A:
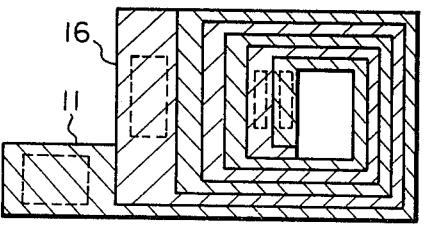
Figure 7B:
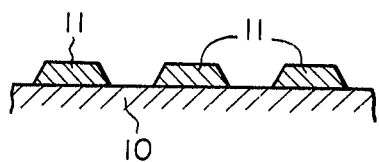
Figure 7B:
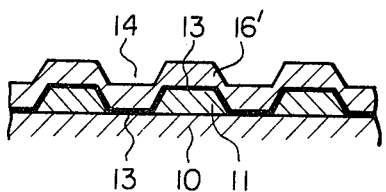
Figure 7B:
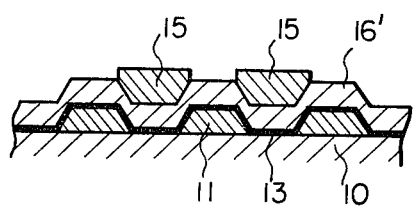
Figure 7B:
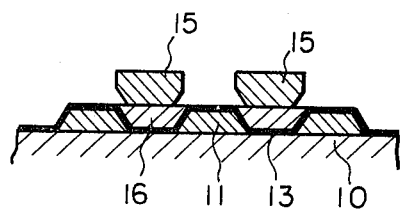
Figure 7B:
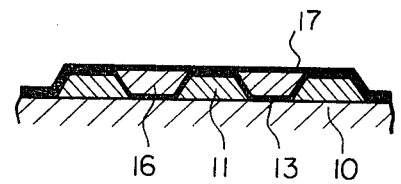

An embodiment of a five-winding coil including two layers of conductor patterns is illustrated in FIGS. 7A and 7B. First, as illustrated in FIGS. 7A-(a) and 7B-(a), a first layer conductor pattern 11, having a plane spiral shape of three windings with substantially equal slits, is formed on a substrate 10. As illustrated in FIGS. 7A-(b) and 7B-(b), an insulating layer 13 of $SiO_2$ or the like is formed on the first layer conductor pattern 11 and a second layer conductor film 16' is then formed on the insulating layer 13. Then, a resist pattern 15 is formed in slits 14 of the spiral shape of the first layer conductor pattern 11, as illustrated in FIGS. 7A-(c) and 7B-(c), and when bevel etching is then carried out, a second layer conductor pattern 16, having a spiral shape of two windings, is formed in the slits 14, as illustrated in FIGS. 7A-(d) and 7B-(d). Then, the resist pattern 15 is removed and an insulating layer 17 is formed as illustrated in FIGS. 7A-(e) and 7B-(e). Thus, the first layer conductor pattern 11 of three windings and the second layer conductor pattern 16 of two windings are flatly formed on the same plane without any pattern crossing.

The process for preparing a thin-film magnetic head by using a multi-winding coil as mentioned above will now be described with reference to FIGS. 8A through 8D and FIG. 9. For convenience, an embodiment using a ten-winding coil having formed as a result of a process wherein four layers of conductor films are deposited will be described.

Figures 8A, 8B, 8C, 8D:
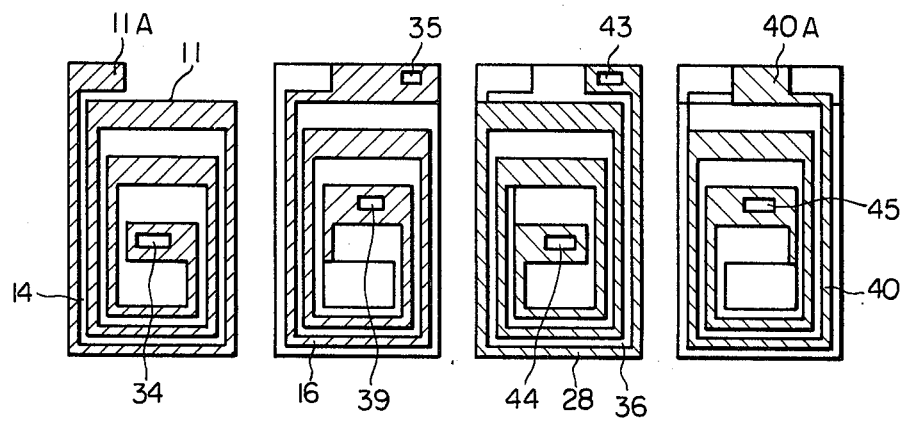

A lower magnetic layer 25 (FIG. 9) is formed on a substrate 24 (FIG. 9) and, according to the process illustrated in FIGS. 7A and 7B, a first layer conductor pattern 11 is formed in a spiral shape of three windings in the counterclockwise direction on the lower magnetic layer 25 with the interposition of an insulating layer 26 (see FIG. 9) therebetween. Then, a second layer conductor pattern 16 is formed in an area of a slit 14 in a spiral shape of two windings in the counterclockwise direction with the interposition of an insulating layer 13 therebetween, whereby a first plane coil layer including two layers of conductor patterns with 5 windings is formed (see FIG. 8B). Then, an inslating layer 17 (FIG. 9) is formed on the second layer conductor pattern 16, and windows 34 and 35 are formed on the inner end of the first layer conductor pattern 11 and on the outer end of the second layer conductor pattern 16, respectively, to expose the conductor patterns. Then, as illustrated in FIG. 8C, a third layer conductor pattern 28 is formed in a spiral shape of three windings in the clockwise direction, namely the direction reverse to the above spiral direction, at a position substantially in agreement with the position of the first layer conductor pattern 11. Then, an insulating layer 37 (FIG. 9) is formed on the third layer conductor pattern 28, and a window 39 is formed on the inner end portion of the second layer conductor pattern 16 to expose the conductor. Then, a fourth layer conductor pattern 40 is formed in a spiral shape of two windings in the clockwise direction in a slit 36 of the third layer conductor pattern 28, namely an area in agreement with the position of the second layer conductor pattern 16 (see FIG. 8D). By laminating the third and fourth layer conductor patterns 28 and 40 in the foregoing manner, a second plane coil layer including two conductor layers with five windings is constructed. It should be noted that, as illustrated in FIG. 9, an upper magnetic layer 30 is formed on a part of the conductor patterns 11, 16, 28 and 40, and a WRITE READ gap 41 is formed between this upper magnetic layer 30 and the lower magnetic layer 25.

When the outer end portions 11A and 40A of the first and fourth layer conductor patterns 11 and 40 are used as terminals for connection of outside wires, the first layer conductor pattern 11 is connected to the third layer conductor pattern 28 by means of the window 34 on the inner end portion thereof, and third layer conductor pattern 28 is connected to the second layer conductor pattern 16 by means of the window 35 on the outer end portion of the second layer conductor pattern 16. Similarly, second layer conductor pattern 16 is connected to the fourth layer conductor pattern 40 by means of the window 39 on the inner end portion thereof. In this way one continuous coil of 10 windings is constructed. It should be noted that, since the window 35 is located at an intermediate position in the entire structure with respect to the number of windings and the resistance value, when a terminal is attached to the window 35, it can be used as center tap.

If a third plane coil layer is to be formed on the second plane coil layer with the interposition of an insulating layer 46, that is, if three layers of inductors are desired rather than the two-layer structure illustrated in FIG. 9, windows 44 and 43 are formed on both the inner and outer end portions of the third layer conductor pattern 28, respectively, and a window 45 is formed on the inner end portion of the fourth layer conductor pattern 40.

The number and positions of windows are appropriately determined according to the shapes of the conductor patterns, the number of laminated layers and the number of laminated plane coil layers. The number of the plane coil layers can optionally be increased by laminating alternately the first and second plane coil layers formed as discussed above in succession.

Further, as pointed out hereinbefore, the number of layers of conductor patterns included in each plane coil layer is not limited to two, but three or four layers of conductor patterns may be formed for each plane coil layer. For example, in the case where each plane coil layer includes three layers of conductor patterns, the conductor patterns may be connected as follows: first layer (first plane coil layer)→fourth layer (second plane coil layer)→second layer (first plane coil layer)→fifth layer (second plane coil layer)→third layer (first plane coil layer)→sixth layer (second plane coil layer) if each plane coil layer includes four layers of conductor patterns, the conductor patterns may, for example, be connected as follows: of first layer (first plane coil layer)-→fifth layer (second plane coil layer)→second layer (first plane coil layer)→sixth layer (second plane coil layer)→third layer (first plane coil layer)→seventh layer (second plane coil layer)→fourth layer (first plane coil layer)→eighth layer (second plane coil layer). As will be apparent from the foregoing illustration, the first and second plane coil layers are connected to each other alternately.

According to the above-mentioned preparation process, a multi-layer coil structure of multi-windings can be formed on the same plane without crossing among a plurality of layers of conductor patterns, and therefore, the disadvantages involved in the conventional photolighographic technique can be eliminated and a multilayer, multi-winding conductor coil applicable to practical uses can be manufactured. Further, since the entire structure is flattened, the increase of the thickness can be controlled and an advantage can be attained with respect to durability. Still further, since conductor patterns can be connected to one another through not only the inner end portions but also the outer end portions, it is easy to form a center tap. Moreover, since unnecessary convexities and concavities are not formed in the upper magnetic layer when a thin-film magnetic head or the like is constructed by using such conductor coils, advantages can be attained with respect to the efficiency of the magnetic circuit and the structure can be reduced in the size.

The concavity of the window, namely the thickness of the insulating layer, is very small as compared with the thickness of the conductor pattern, and thereafore, no particular disadvantage is caused by the concavity of the window.

A method of preparing a multi-track, thin-film magnetic head by utilizing the above-mentioned process for forming a multi-winding film coil according to the present invention will now be described. For convenience, the following illustration is presented with regard to a four-track magnetic head.

Each magnetic head is prepared according to the process illustrated in FIGS. 8A to 8D and has a structure as shown in FIG. 9. In principle, if a predetermined number of thin-film magnetic heads are simultaneously formed according to such process, there can be constructed a multi-track thin-film magnetic head. In order to avoid formation of a slit between every two adjacent magnetic heads, the following improvements are made. Namely, when a first layer conductor pattern 11 is formed on a lower magnetic layer 25 (see FIG. 9) on a substrate 24, as illustrated in the left half FIG. 10A, a first layer conductor pattern 11' of a second magnetic head, corresponding to a second layer conductor pattern 16 of a first magnetic head, is formed adjacently to the first layer conductor pattern 11 of the first magnetic head (located on the left half of FIG. 10A) with slit d therebetween. In other words, the first layer conductor pattern 11' of the second magnetic head has a pattern shape corresponding to that of the second layer conductor pattern 16 of the first magnetic head. The slit k has a width equal to the pattern width t (see FIG. 10B) of the second layer conductor patterns 16 and 16' formed on the slit d. In the embodiment illustrated in the drawing, the conductor pattern 11 has a spiral shape of two windings in the clockwise direction, and the conductor pattern 11' has a spiral shape of three windings in the clockwise direction. The first layer conductor patterns 11 and 11' illustrated in the left half of FIG. 10A are repeated, depending upon the number of magnetic heads (4 in the drawing). As illustrated in FIGS. 10B, the second layer conductor patterns 16 and 16' are arranged alternately in an order reverse to the order in the arrangement illustrated in FIG. 10A. These second layer conductor patterns 16 and 16' are formed so as to fill up the slits between the first layer conductor patterns 11 and 11' according to the process as shown in FIGS. 7A and 7B. The second layer conductor patterns 16 and 16' (having a width t) are formed on the slits d between the first layer conductor patterns 11 and 11'. Accordingly, the respective magnetic heads are arranged without any slit. By overlapping the second layer conductor patterns 16 and 16' on the slits between the first layer conductor patterns 11 and 11', there is formed a first plane layer as illustrated in FIG. 7B-(e). The state where up to the second layer conductor patterns are formed is illustrated in the plane view of FIG. 11A.

Third layer conductor patterns 28 and 28' (See FIG. 10C) and fourth layer conductor patterns 40 and 40' (see FIG. 10D) constituting the second plane layer are formed in a similar manner. In this case, the winding directions of the third layer conductor patterns 28 and 28' and the fourth layer conductor patterns 40 and 40' are reverse to those of the first layer conductor patterns 11 and 11' and the second layer conductor patterns 16 and 16', respectively. Furthermore, the third layer conductor pattern 28 of an odd-numbered magnetic head corresponds to the fourth layer conductor pattern 40' of an even-numbered magnetic head, while the third layer conductor pattern 28' of an even-numbered magnetic head corresponds to the fourth layer conductor pattern 40 of an odd-numbered magnetic head. A second plane layer formed by the third layer conductor patterns 28 and 28' and the fourth layer conductor patterns 40 and 40' is illustrated in FIG. 11B.

For example, in the case of an odd-numbered magnetic head, the inner end portion of the first layer conductor pattern 11 is connected to the inner end portion 44 of the third layer conductor pattern 28 through the window 34; the outer end portion of the third layer conductor pattern 28 is connected to the outer end portion 35 of the second layer conductor pattern 16 by the window 43, and, the inner end portion of the second layer conductor pattern 16 is connected to the inner end portion 45 of the fourth layer conductor pattern 40 by the window 39. When terminals or the like are connected to the windows 11A and 40A on the outer end portions of the first and fourth layer conductor patterns 11 and 40 in the above-mentioned connection state, the respective conductor patterns 11, 16, 28 and 40 are connected in a line to form a coil of 10 windings. Also with respect to an even-numbered magnetic head, a coil of 10 windings is formed in a manner similar manner.

Finally, an upper magnetic layer 30, as illustrated in FIG. 9, formed to produce a multi-track magnetic head including a plurality of magnetic heads arranged in a line without any slits.

As will be apparent from the foregoing description, by using the coil-preparing process disclosed by the present invention, a multi-track magnetic head having a plurality of magnetic heads arranged without any slits can be manufactured, and the track density can be increased in a magnetic disc device or the like.

It will readily be understood that a transformer can be constructed by disposing, for example, an annular iron core 61 to spread over two adjacent coils formed according to the steps illustrated in FIGS. 11A and 11B, though this feature is not specifically illustrated in the drawing.

As described hereinbefore, according to the present invention, since a flattened, filmy, multi-layer, multi-winding, coil can be prepared, the defects described in the introduction part of this specification can be eliminated and the intended objects of the present invention can be attained.

I claim:

1. A process for the preparation of thin-film coils, which comprises: forming a first plane coil layer having a flat top face by arranging a plurality of first spiral conductor patterns wound in the same direction, each of said first conductor patterns being positioned on the same plane adjacent to one another and being insulated from one another; forming an insulating layer on said first plane coil layer, said insulating layer having a plurality of selectively positioned apertures therein such that each of said conductor patterns is exposed by at least one aperture; and forming and laminating on said insulating layer a second plane coil layer which overlaps some of said plurality of apertures by arranging a plurality of second spiral conductor patterns wound in a direction opposite to that of said plurality of first spiral conductor patterns of the first plane coil layer, each of said second conductor patterns being positioned on the same plane adjacent to one another and being insulated from one another, the conductor patterns in the first plane coil layer being directly connected through said apertures to the conductor patterns in the second plane coil layer alternatively to form one coil comprising all of said conductor patterns thus directly connected in series.

2. A process for the preparation of film coils according to claim 1, further comprising the steps of laminating a plurality of first plane coil layers and a plurality of second plane coil layers alternately, and connecting the spiral conductor patterns in every two adjacent plane coil layers continuously in series.

3. A process for the preparation of film coils according to claim 1, wherein the steps of forming said first and second plane coil layers are conducted by forming said first and second spiral conductor patterns with a predetermined taper angle arranged so that the taper portions of the respective spiral conductor patterns are piled onto each other with insulation between them.

4. The process of claim 1, 2, or 3, further comprising the step of providing a center tap at one of the connections between the conductor patterns in said first and second plane coil layers.

* * * * *

UNITED STATES PATENT AND TRADEMARK OFFICE
CERTIFICATE OF CORRECTION

PATENT NO. : 4,416,056

DATED : November 22, 1983

INVENTOR(S) : Takahashi

It is certified that error appears in the above-identified patent and that said Letters Patent is hereby corrected as shown below:

```
Col. 3, line 59, begin new paragraph with "A".
Col. 4, line 3, delete ",";
        line 62, delete "having".
Col. 6, line 14, after ")" (second occurrence) insert --.--;
        line 14, "if" should be --If--;
        line 17, delete "of";
        line 67, after "half" insert --of--.
Col. 7, line 8, "k" should be --d--.
Col. 8, line 3, delete "manner" (first occurrence).
```

Signed and Sealed this

Tenth Day of April 1984

[SEAL]

Attest:

GERALD J. MOSSINGHOFF

Attesting Officer

Commissioner of Patents and Trademarks